(12) United States Patent
Johnson et al.

(10) Patent No.: US 8,365,302 B2
(45) Date of Patent: Jan. 29, 2013

(54) APPARATUS, SYSTEMS AND METHODS FOR AUTHENTICATING WIDGET ACCESS AND WIDGETS

(75) Inventors: David M. Johnson, Raleigh, NC (US); Jamey Wood, Louisville, CO (US); Vijay Ramachandran, Cupertino, CA (US)

(73) Assignee: Oracle America, Inc., Redwood City, CA (US)

( * ) Notice: Subject to any disclaimer, the term of this patent is extended or adjusted under 35 U.S.C. 154(b) by 811 days.

(21) Appl. No.: 12/407,577

(22) Filed: Mar. 19, 2009

(65) Prior Publication Data
US 2010/0242121 A1 Sep. 23, 2010

(51) Int. Cl.
*G06F 21/00* (2006.01)
(52) U.S. Cl. .................................. 726/28; 726/4; 726/17
(58) Field of Classification Search .................. 726/3–6, 726/16–18, 26–28; 705/319
See application file for complete search history.

(56) References Cited

U.S. PATENT DOCUMENTS

| | | | | |
|---|---|---|---|---|
| 7,565,536 | B2 * | 7/2009 | Vassilev et al. | 713/168 |
| 7,730,216 | B1 * | 6/2010 | Issa et al. | 709/250 |
| 2009/0320115 | A1 * | 12/2009 | Dean et al. | 726/8 |

OTHER PUBLICATIONS

Alex Iskold, "Social Graph: Concepts and Issues," Sep. 12, 2007.*
Henry Work, "Google Confirms Friend Connect," May 12, 2008.*
Dave Morin, "Announcing Facebook Connect," May 9, 2008.*

* cited by examiner

*Primary Examiner* — Fikremariam A Yalew
*Assistant Examiner* — Kendall Dolly
(74) *Attorney, Agent, or Firm* — Polsinelli Shughart PC

(57) ABSTRACT

In some embodiments, a content server receives a request for a widget from a web server, specifying a user identifier and a delegation server. If the delegation server is trusted, the user's identity is ascertained using the user identifier. The widget is delivered having a context of the user's identity. The content server receives a request to access content generated utilizing the widget incorporated into a web page and allows access based on the context of the widget. In other embodiments, a social network server receives a request from a web server for a widget. The widget is delivered having a source indicator. Subsequently, the social network server receives a request to access the social graph generated utilizing the widget incorporated into a web page. If the request includes a change to the social graph, the social network server allows the request if the widget is trusted.

19 Claims, 7 Drawing Sheets

APPARATUS, SYSTEMS AND METHODS FOR AUTHENTICATING WIDGET ACCESS AND WIDGETS

FIELD OF THE INVENTION

Aspects of this invention relate generally to computer systems, and more specifically to authenticating widget access and widgets.

BACKGROUND

Social networking features (such as profile features, blog features, wiki features, messaging features and other user interaction features) are becoming a necessary part of web sites, both in public-facing web properties and within the enterprise. Organizations want to add social networking features to their web sites, but to do this they must typically either implement the features themselves or use a third party social network, which forces user information to be shared to other networks and requires users to leave the initial site.

SUMMARY

Aspects of the present disclosure provide systems and methods for controlling widget access to the social network server and the social graph, as well as authenticating widgets. In one or more embodiments, a content server receives a request for at least one widget from a web server. The request specifies a user identifier and a delegation server. The content server determines whether the delegation server is trusted. If the delegation server is trusted, the content server ascertains the identity of the user by transmitting the user identifier to the delegation server and receiving the identity of the user from the delegation server. The widget is delivered via the content server having a context corresponding to the identity of the user. The content server receives a request to access content of the content server generated utilizing the widget incorporated into a web page provided by the web server. The content server allows access to the content based on the context of the widget. Thus, the use of the widget is authenticated to have the same access to the content as the user.

In one or more alternative embodiments, a social network server receives a request from a web server for at least one widget operable to access a social graph maintained on the social network server. The widget is delivered via the social network server having a source indicator. Subsequently, the social network server receives a request to access the social graph generated utilizing the widget incorporated into a web page provided by the web server to provide a social network function via the web page. The social network server determines whether the widget is trusted. If the request to access the social graph includes a change to the social graph, the social network server allows the request to access if the widget is trusted. Thus, the widget itself may be authenticated.

These various features enable social networking features to be added to existing web sites without requiring the web site owner to implement social networking features from scratch or to utilize third party social networks, among other uses and benefits.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

DETAILED DESCRIPTION

Organizations that want to add social networking features to their web sites might utilize a social network server by incorporating widgets (portable chunks of code that can be installed and executed within any separate web page without requiring additional compilation) in the web pages of the web site. Widgets provide for interacting with a social graph of the social network server. The social graph contains, in one possible implementation, the data concerning individuals or groups in a social network and information about their interrelations.

Aspects of the present disclosure provide systems and methods for controlling widget access to the social network server and the social graph, as well as authenticating widgets. When a widget is requested, a user identifier may be submitted along with the address of a delegation server. The identifier is used to obtain the identity of the user from the delegation server when the delegation server is considered "trusted" by the system. The widget may then be delivered having a context of the identity of the user, such that the widget when used has a context of the identity of the user. Thus, the use of the widget is authenticated to have the same access to the social graph as the user. Additionally, the widget may be embedded with the source of the widget. The widget, in some implementations, is allowed to modify the social graph when the source of the widget is trusted. Thus, the widget itself may be authenticated. In this way, both the access of the widget and the widget itself may be authenticated. These various features enable social networking features to be added to existing web sites without requiring the web site owner to implement social networking features from scratch or to utilize third party social networks, among other uses and benefits.

Figure 1:
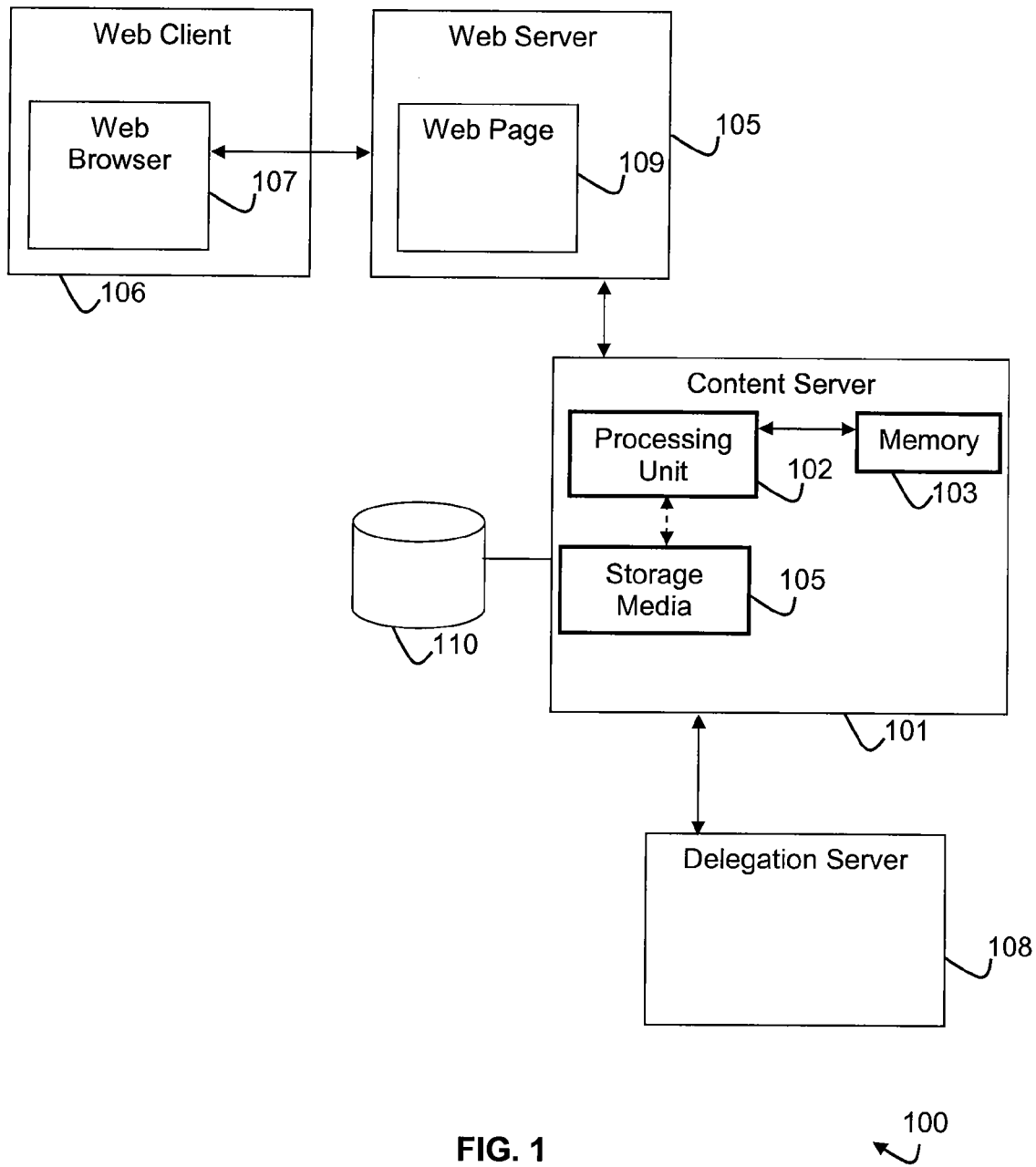
FIG. 1 is a block diagram illustrating a system 100 for authenticating widget access, in accordance with one or more embodiments of the present disclosure.

FIG. 1 illustrates a system 100 for authenticating widget access, in accordance with an embodiment of the present disclosure. The system 100 involves a web server 105 hosting one or more web pages 109 that are served to a web browser 107, upon request, operating on a client device (personal computer, personal digital assistant, or any other device capable of operating a web browser). A content server 101 is communicably coupled with a delegation server 108.

The content server 101 may include one or more processing units 102 and various forms of memory 103 communicably coupled to the processing unit 102. The content server 101 may also be configured to interact (read/write) to one or more tangible machine-readable storage media 104, which may or may not be removable and which may include magnetic storage media (e.g., floppy diskette), optical storage media (e.g., CD-ROM); magneto-optical storage media, read only memory, random access memory, erasable programmable memory (e.g., EPROM and EEPROM); flash memory, or other types of media suitable for storing electronic information. Hence, the content server 101 may include a CD-ROM drive, a floppy drive, a hard disk drive, etc. The content server 101 may also include (not shown) one or more input and/or output devices (including, but not limited to displays, keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth).

The content server 101 may include content stored in the memory 103 and/or the tangible machine-readable storage media 104, which may be stored in a database 110. The stored content may be partitioned such that each partition is accessible by one or more users. The access of each user to each of the one or more partition may be defined to specify the access rights the user has (i.e., the ability to view and/or modify) with respect to that partition. The part of the content which a user may access may include the one or more partitions defined as accessible by the user.

The web server 105, delegation server 108, and/or web client computing device 106 may include (not shown) one or more processing units, memories, tangible machine-readable storage media, input and/or output devices (including, but not limited to displays, keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth). The web server 105 is configured to serve one or more web pages 109 to the web client computing device 106. The web client computing device 106 includes a web browser application 107 for requesting and/or displaying the one or more web pages 109 provided by the web server 105. Though the web server 105 and the delegation server 108 are shown as separate devices, in some embodiments the web server 105 and the delegation server 108 may constitute a single device.

Figure 2:
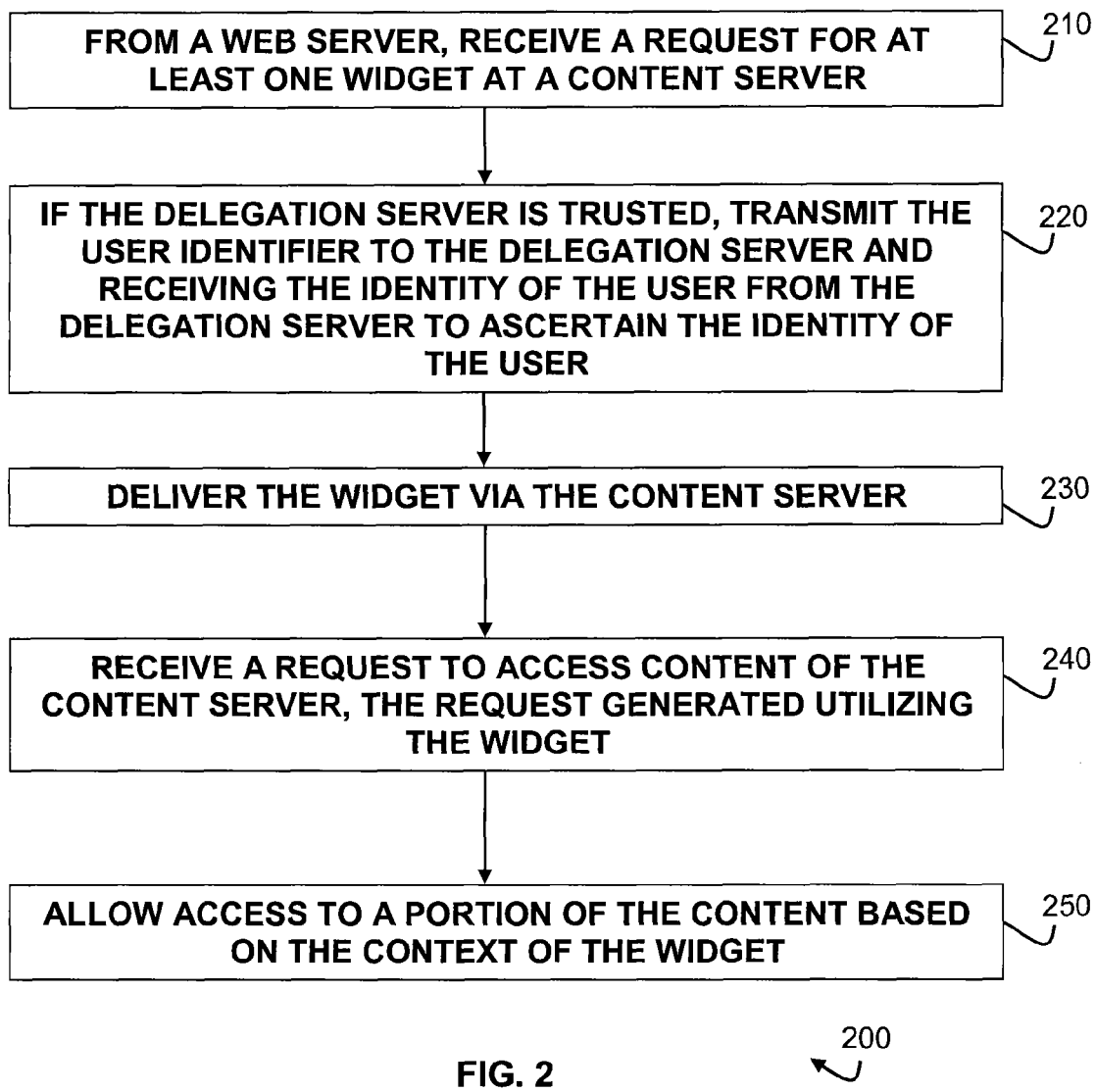
FIG. 2 is a method diagram illustrating a method 200 for authenticating widget access, which may be performed by the system 100 of FIG. 1, in accordance with one or more embodiments of the present disclosure.

FIG. 2 illustrates a method 200 for authenticating widget access, which may be performed by the system 100, in accordance with one or more embodiments of the present disclosure. The method 200 may comprise a computer-implemented method, with the method performed by a processing unit, such as the processing unit 102, executing one or more sets of instructions included in a computer program product stored in a machine-readable medium, such as the memory 103 and/or the storage medium 104.

In a first operation 210, the content server 101 may receive a request for at least one widget via the web server 105. The request for the widget may be generated by the web browser 107. In one particular implementation, a widget is considered a portable chunk of code that can be installed and executed within any separate web page without requiring additional compilation. The request may specify a user identifier and a delegation server, which may be the delegation server 108.

In a second operation 220, the content server 101 ascertains an identity of a user. The content server 101 may ascertain the identity of the user by transmitting the user identifier to the delegation server 108 and receiving the identity of the user from the delegation server 108. The user identifier may have been generated, such as by the web server 105, to identify the user and correspond to the identity of the user. The user identifier and the corresponding identity of the user may have been stored in the delegation server 108, such as in a list of user identifiers and corresponding identities of users. The delegation server 108 may check the list for the user identifier and return the identity of the user that corresponds to the user identifier. The content server 101 may also verify that the delegation server 108 is trusted before utilizing the delegation server 108 to ascertain the identity of the user. In one example, the content server 108 verifies that the delegation server 108 is trusted by checking that the delegation server 108 is on a trusted delegate list of the content server 108. The trusted delegate list may be a specification of delegates that the content server 101 is to trust and may be stored in a list data structure in the memory 103, the storage media 105 and/or the database 110 on the content server 101. The list may have been populated with delegates that the content server 101 is to trust by an administrator of the content server 101.

In a third operation 230, the content server 101 delivers the widget, or widgets as the case may be. The widget may be stored on the content server 101, such as in the memory 103 and/or the tangible machine-readable storage media 104, and hence the content server 101 may deliver the widget to the web server 105 and/or the web browser 107. Alternatively, the widget may be stored on another computing device, separate from the content server 101, and the content server 101 may access the widget from the other computing device and deliver the widget to the web server 105 and/or the web browser 107. The widget may include an embedded context corresponding to the identity of the user.

Once the widget has been delivered to the web server 105 or the web browser 107, in a fourth operation 240, the content server 101 may receive a request to access content of the content server 101 generated utilizing the widget on the web server 105 or the web browser 107. As the request was made utilizing the widget, the request may have the same context as the widget. Stated differently, in one example, the request generated from the widget includes the embedded identity of the user context.

The request, in one example, is made utilizing a web page provided by the web server 105. The web server 105 may have incorporated the widget into the web page. The web page, which incorporates the widget, may then have been utilized by the web browser 107 to make the request.

In some embodiments, the content server 101 may be a social network server and the content may include a social graph. A social graph may include a variety of data regarding the users of a social network and the relationships among those users. In these embodiments, the web server 105 may incorporate the widget into the web page provided to the web page to the web browser 107 on the web client computing device 106 in order to provide a social network function. A social network function may include any social network feature such as a profile feature, blog feature, wiki feature, messaging feature and/or other user interaction feature.

The web page may include a web page template for the social network feature. The web page template may include one or more features that are common to the web page provided to any user for the social network feature. The web server 105 may provide the web template to the web browser 107 on the web client computing device 106 for any user requesting the web page for the social network feature. Further, the web server 105 may provide the web page template as part of providing the web page for the social network feature to the web browser 107. The web server 105 may incorporate the widget and the web template into the web page for the social feature. The widget may be operable to provide the portions of the web page that are customized for the specific user of the web browser 107 by obtaining and presenting data from the social graph.

For example, all users of a social network feature on a web server with an Internet address of xyz.com may access a profile page at xyz.com/social/profile.html. When a specific user requests the profile web page, the xyz.com web server may provide a web page incorporating a profile web page template and a getProfile widget. The profile web page template may include all of the features that are common to a profile web page provided to any user. The getProfile widget may be operable to obtain and present data from the social graph related to the specific user. The profile web page provided to the specific user, as it includes the common features of the profile web page template and the user specific data presented via the getProfile widget, may thus display data concerning the specific user's profile.

The request to access content of the content server 101 may include a request for an address of an additional web page. The additional web page may be a web page for providing a particular social network function for one of a plurality of users, such as a blog page for one or more users. The content server 101 may construct the requested address by combining an address template for the particular social function with an identifier of the one of the plurality of users. For example, a user's profile page may include a list of their friends and links to their friends profile pages. When a user requests their profile page, the request may include a request for an address of the profile page of one or more of their friends. The address of the friend's profile page may be xyz.com/social/profile.html=friend'sidentifier where friend'sidentifier is a user identifier for the friend. The content server 101 may have an address template for profile pages of xyz.com/social/profile.html. hence, the content server 101 can construct the requested address by combining the address template with the friend's identifier, resulting in xyz.com/social/profile.html=friend'sidentifier.

In a fifth operation 250, the content server 101 allows access to a portion of the content of the content server 101 based on the context of the widget. As the context of the corresponds to the identity of the user, the portion of the content to which the content server 101 allows access may be a subset of the part of the content defined as accessible by the user.

Figure 3:
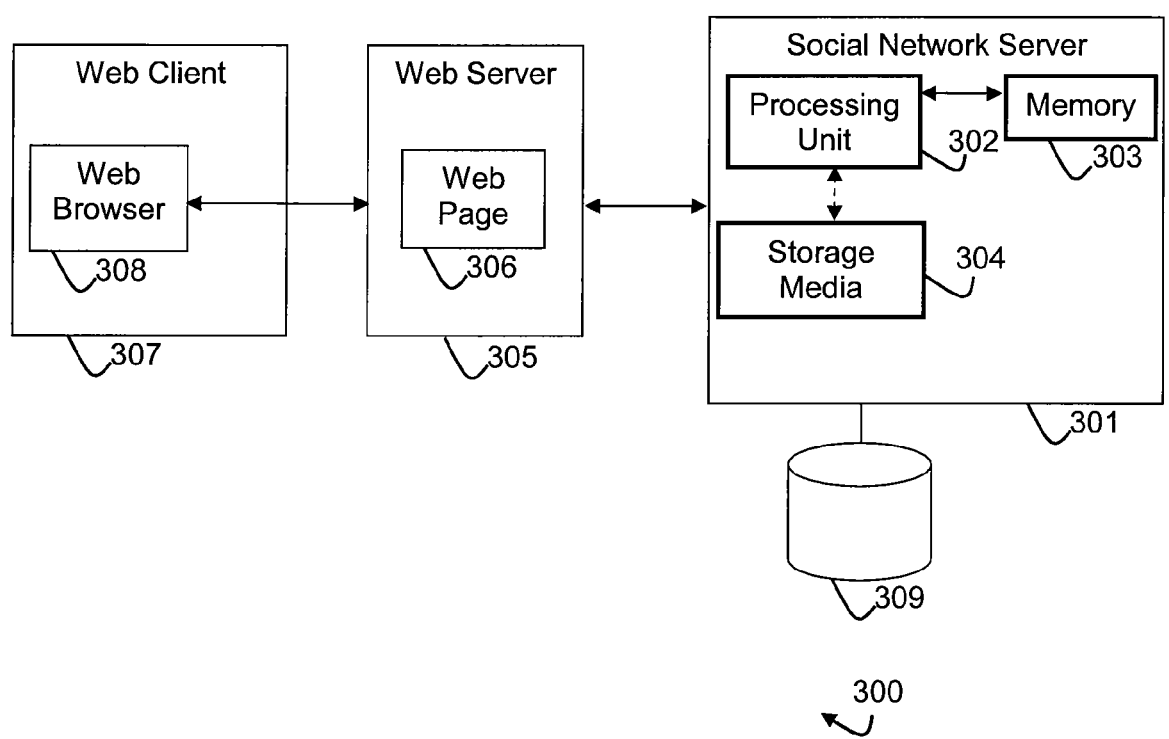
FIG. 3 is a block diagram illustrating a system 300 for authenticating widgets, in accordance with one or more alternative embodiments of the present disclosure.

FIG. 3 illustrates a system 300 for authenticating widgets, in accordance with one or more alternative embodiments of the present disclosure. The system 300 includes a social network server 301. A web server 305 is communicably coupled to social network server 301 and web client computing device 307 is communicably coupled to the web server 305, such as by way of the Internet. The social network server 301 may include one or more processing units 302 and one or more memories 303 communicably coupled to the processing unit 302. The social network server 301 may also be configured to interact (read/write) to one or more tangible machine-readable storage media 304, which may or may not be removable and which may include magnetic storage media (e.g., floppy diskette), optical storage media (e.g., CD-ROM); magneto-optical storage media, read only memory, random access memory, erasable programmable memory (e.g., EPROM and EEPROM); flash memory, or other types of media suitable for storing electronic information. Hence, the social network server 301 may include a CD-ROM drive, a floppy drive, a hard disk drive, etc. The social network server 301 may also include (not shown) one or more input and/or output devices (including, but not limited to displays, keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth).

The social network server 301 is configured to maintain and control access to a social graph stored in the memory 303, the tangible machine-readable storage media 304, and/or a database 309 accessible by the social network server 301. The social graph may be partitioned so that access to partitions is limited to some specific set of users. The partition access of each user may be defined to specify the access rights of the user (e.g., the ability to view and/or modify) with respect to that partition.

The web server 305 and/or web client computing device 307 may include (not shown) one or more processing units, memories, tangible machine-readable storage media, input and/or output devices (including, but not limited to displays, keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth).

The web server 305 is configured to serve, upon request, one or more web pages 306 to the web client computing device 307. The one or more web pages 306, in one example, implement a social networking function. The social network function may include any social network feature such as a profile feature, blog feature, wiki feature, messaging feature and/or other user interaction feature. The web client computing device 307 includes a browser application 308 for requesting and/or displaying the one or more web pages 306 provided by the web server 305. In some embodiments, the system 300 may also include a delegation server (not shown), communicatively coupled to the social network server 301, which may be incorporated into the web server 305 or may constitute a separate computing device.

Figure 4:
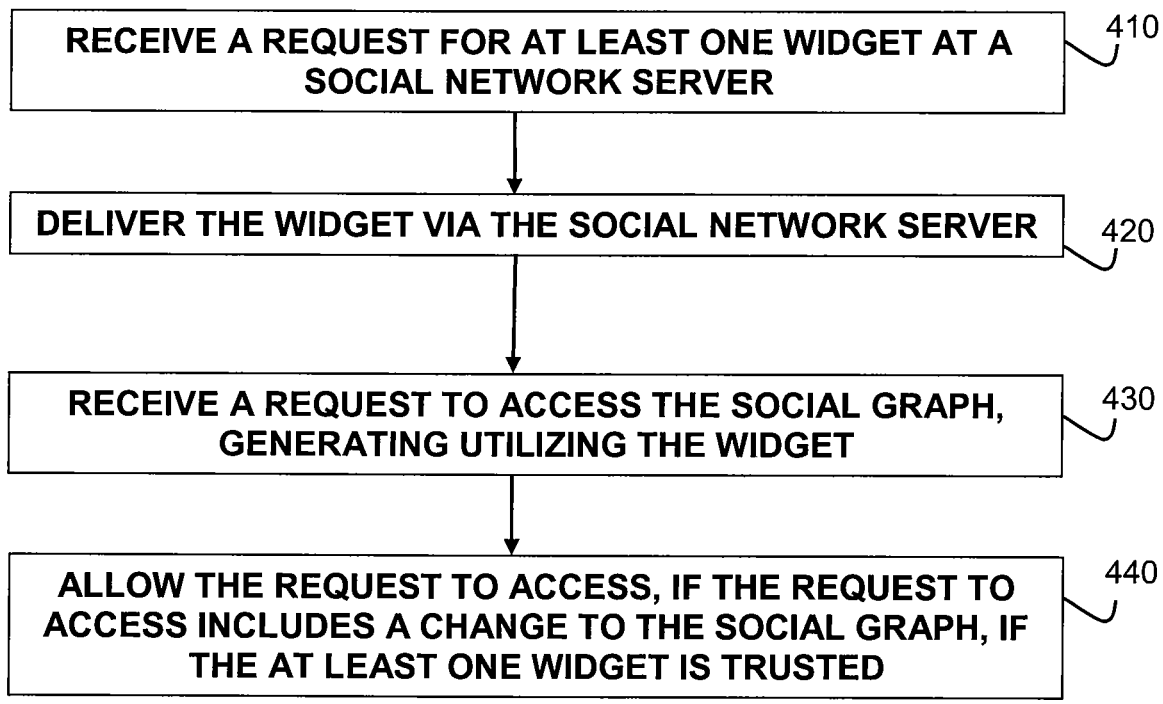
FIG. 4 is a method diagram illustrating a method 400 for authenticating widgets utilized to access a social graph, which may be performed by the system 300 of FIG. 3, in accordance with one or more embodiments of the present disclosure.

FIG. 4 illustrates a method 400 for authenticating widgets utilized to access or implement other functions of a social graph, which may be performed by the system 300, in accordance with one or more embodiments of the present disclosure. The computer-implemented method 400 may be performed by a processing unit, such as the processing unit 302, executing one or more sets of instructions included in a computer program product stored in a machine-readable medium, such as the memory 303 and/or the storage medium 304.

In a first operation 410, the social network server 301 may receive a request for one or more widgets. The request may be submitted by the browser 308 via the web server 305. in one implementation, the widget is operable to access the social graph maintained on the social network server 301.

In a second operation 420, the social network server 301 delivers the widget, or widgets as the case may be, to the web server 305 and/or the browser 307. The widget may be stored on the social network server 301, such as in the memory 303 and/or the tangible machine-readable storage media 304, and hence the social network server 301 may deliver the at least one widget to the web server 305 or the browser 308. Alternatively, at widget may be stored on another computing device, separate from the social network server 301, and the social network server 301 may access the widget from the other computing device and deliver the widget to the web server 305 or the browser 308. The widget may included an embedded indicator that indicates the source of the widget.

Once the widget has been delivered to the web server 305 or the browser 308, in a third operation 430, the social network server 301 may receive a request to access the social graph generated utilizing the widget on the web server 305 or the browser 308. As the request was made utilizing the widget, the request may include the source indicator of the widget.

The request, in one example, is made utilizing a web page provided by the web server 305. The web server 305 may have incorporated the widget into the web page. The web page, which incorporates the widget, may then have been utilized by the web browser to make the request.

The request to access the social graph may include a request for an address of an additional web page. The additional web page may be a web page for providing a particular social network function for one of a plurality of users, such as a blog page for one or more users. The social network server 301 may construct the requested address by combining an address template for the particular social function with an identifier of the one of the plurality of users. For example, a user's blog subscription page may include a list of the blogs the user subscribes to and links to the blogs profile pages. When a user requests their blog subscription page, the request may include a request for an address of the blog page of one or more other users whose blog the user subscribes to. The address of the one other user's blog page may be xyz.com/social/blog.html=otheruser'sidentifier where otheruser'sidentifier is a user identifier for the one other user. The social network server 301 may have an address template for blog pages of xyz.com/social/blog.html. hence, the social network server 301 may construct the requested address by combining the address template with the one other user's identifier, resulting in xyz.com/social/blog.html=otheruser'sidentifier.

In the fourth operation 440, the social network server 301 may allow the request to access the social graph. If the request to access includes a change to the social graph the social network server 301 may only allow the request to access if the widget is trusted. The social network server 301 may verify that the widget is trusted by checking that the source indicator of the widget is on a trusted source list of the social network server 301.

Figure 5:
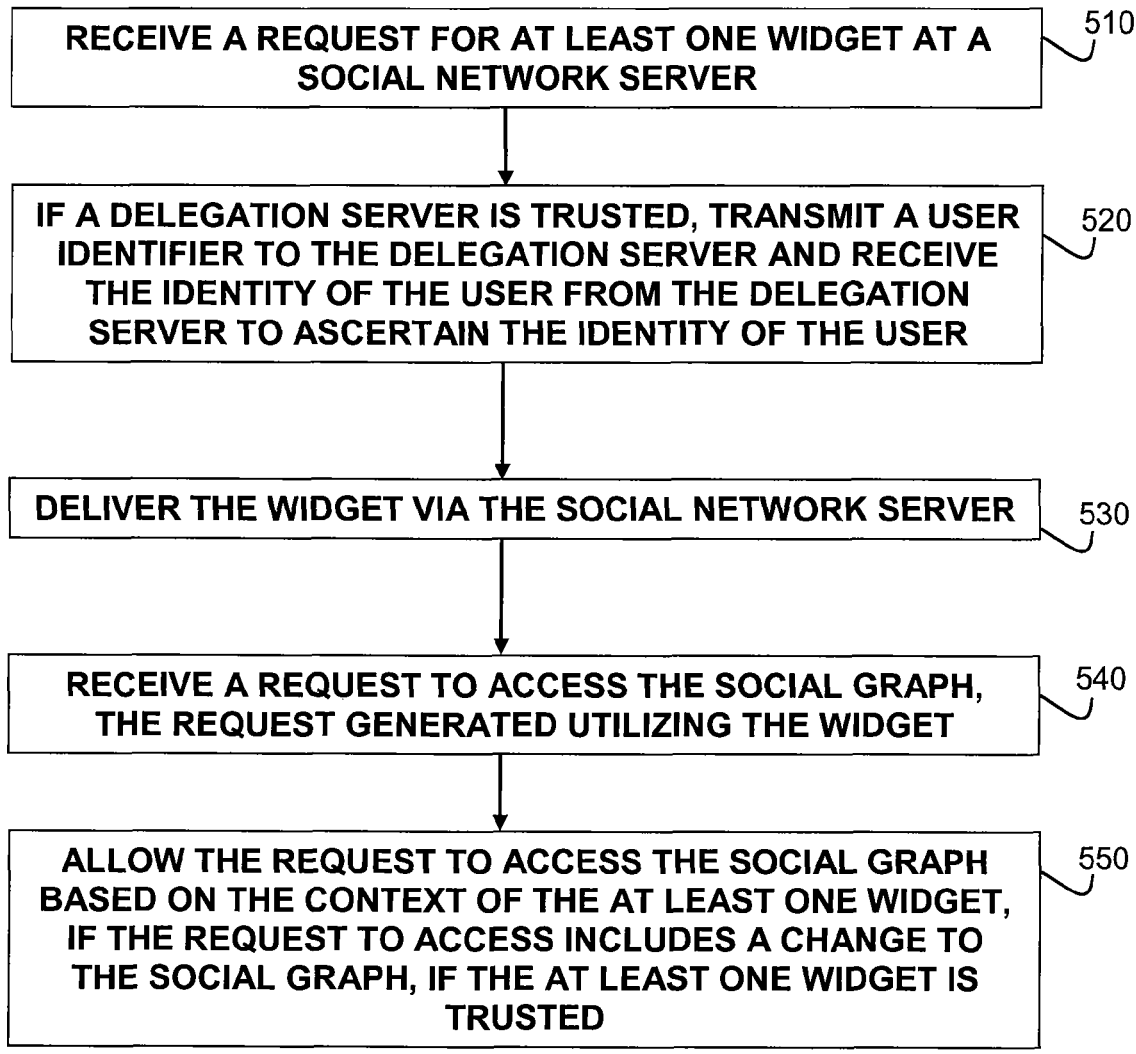
FIG. 5 is a method diagram illustrating a method 500 for authenticating access of authenticated widgets to a social graph, which may be performed by the system 300 of FIG. 3, in accordance with one or more alternative embodiments of the present disclosure.

FIG. 5 illustrates a method 500 for authenticating access of authenticated widgets to a social graph, which may be performed by the system 300, in accordance with one or more alternative embodiments of the present disclosure. The computer-implemented method 500 may be performed by a processing unit, such as the processing unit 302, executing one or more sets of instructions included in a computer program product stored in a machine-readable medium, such as the memory 303 and/or the storage medium 304.

In a first operation 510, the social network server 301 may receive a request for at least one widget via the web server 305. The request for the at least one widget may be generated by the browser 308. The request may specify a user identifier and a delegation server. The at least one widget may be operable to access the social graph maintained on the social network server 301.

In a second operation 520, the social network server 301 ascertains an identity of a user. The social network server 301 may ascertain the identity of the user by transmitting a user identifier to a delegation server and receiving the identity of the user from the delegation server. The social network server 301 may also verify that the delegation server is trusted before utilizing the delegation server to ascertain the identity of the user. in one example, the social network server 301 verifies that the delegation server is trusted by checking that the delegation server is on a trusted list of the social network server 301.

In a third operation 530, the social network server 301 delivers the widget, or widgets as the case may be. The widget may be stored on the social network server 301, such as in the memory 303 and/or the tangible machine-readable storage media 304, and hence the social network server 301 may deliver the widget to the web server 305 and/or the browser 308. Alternatively, the widget may be stored on another computing device, separate from the social network server 301, and the social network server 301 may access the widget from the other computing device and deliver the widget to the web server 305 and/or the web browser 308. The widget may include an embedded indicator that indicates the source of the at least one widget and an embedded context corresponding to the identity of the user.

Once the widget has been delivered to the web server 305 or the browser 308, in a fourth operation 540, the social network server 301 may receive a request to access the social graph generated utilizing the widget on the web server 305 or the browser 308. As the request was made utilizing the widget, the request may include the source indicator of the at least one widget and may have the same context as the widget.

The request, in one example, is made utilizing a web page provided by the web server 305. The web server 305 may have incorporated the widget into the web page which may then have been utilized to make the request.

The web page may include a web page template for the social network feature. The web page template may include one or more features that are common to the web page provided to any user for the social network feature. The web server 305 may provide the web template to the browser 308 on the web client computing device 307 for any user requesting the web page for the social network feature. Further, the web server 305 may provide the web page template as part of providing the web page for the social network feature to the browser 308. The web server 305 may incorporate the widget and the web template into the web page for the social feature. The widget may be operable to provide the portions of the web page that are customized for the specific user of the browser 307 by obtaining and presenting data from the social graph.

For example, all users of a social network feature on a web server with an Internet address of xyz.com may access a friends page at xyz.com/social/friends.html. When a specific user requests the friend web page, the xyz.com web server may provide a web page incorporating a friend web page template and a getFriends widget. The friend web page template may include all of the features that are common to a friend web page provided to any user. The getFriends widget may be operable to obtain and present data from the social graph related to the friends of the specific user. The friend web page provided to the specific user, as it includes the common features of the friend web page template and the user specific data presented via the getFriends widget, may thus display data concerning the specific user's friends.

In a fifth operation 550, the social network server 301 may allow the request to access the social graph based on the context of the widget. As the context of the widget corresponds to the identity of the user, the portion of the social graph to which the social network server 301 allows access may be a subset of the social graph defined as accessible by the user. If the request to access includes a change to the social graph the social network server 301 may only allow the request to access if the widget is trusted. The social network server 301 may verify that the widget is trusted by checking that the source indicator of the widget is on a trusted source list of the social network server 301.

Figure 6:
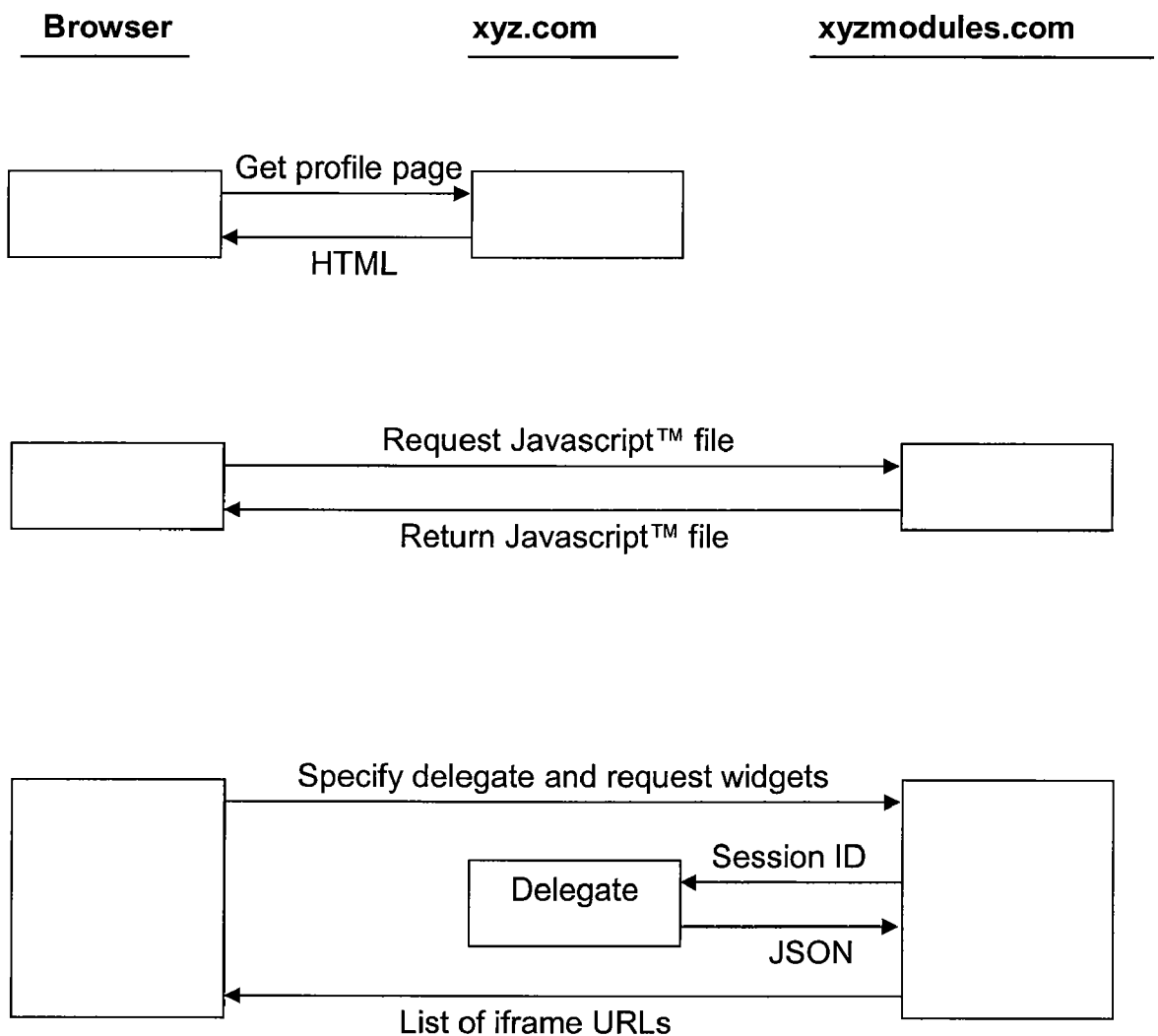
FIG. 6 is a block diagram illustrating the performance of an example implementation of the method of FIG. 5.

By way of example, with reference to FIG. 6, a user of a web browser on a web client computing device requests their profile web page from a web server providing a profile social networking feature. The web server has an address of xyz.com. In this example, the user has previously logged into the xyz.com site, having provided a user login and/or password to the xyz.com web server. Upon being provided the user login and/or password, the xyz.com web server verified the user's identity utilizing a user database and assigned the user a session identifier. The xyz.com web server recorded this session identifier in a cookie, which was then transmitted to the user and recorded on the web client computing device. Subsequent requests from the user to the xyz.com site then included the cookie.

The user requests their profile web page from an address of xyz.com/social/profile. The xyz.com site returns a web page to the web browser that incorporates a profile web page template. The web page template includes features common to all profile pages of the xyz.com site. The web page template also includes a reference to a getProfile widget, a reference to a delegate server to utilize, and a reference to a JavaScript™ (a scripting language commonly utilized for client-side development) file residing on a social network server that has an address of xyzmodules.com. When the web browser receives the web page, the web browser requests the JavaScript™ file from xyzmodules.com. The JavaScript™ file includes an API (application programming interface) for specifying the delegation server to utilize. Xyzmodules.com sends the JavaScript™ file to the web browser. The web browser then utilizes the JavaScript™ file to request the getProfile widget from xyzmodules.com, specifying that the getProfile widget is requested, to use xyz.com as the delegation server, and that the session identifier from the cookie.

When xyzmodules.com receives the request for the getProfile widget, xyzmodules.com checks if xyz.com is on a trusted list of delegation servers of xyzmodules com. Xyzmodules.com does not respond to the request for the getProfile widget if xyz.com is not on the trusted list of delegation servers. In this example, xyz.com is on the trusted list of delegation servers so xyzmodules.com transmits the session identifier to xyz.com. Xyz.com responds with the identity of the user that corresponds to the session identifier. Xyzmodules.com then transmits an iframe (a hypertext markup language element that enables the embedding of a hypertext markup language document in another hypertext markup language document) url (uniform resource locator) for the getProfile widget, appending a security token which includes the identity of the user and the iframe url, to the web browser. The web browser then makes a DOM (document object model—a platform and language-independent standard object model for representing hypertext markup language or extensible markup language documents as well as an application programming interface for querying, traversing and manipulating such documents) call for the web page and supplies the DOM call with the iframe url.

Figure 7:
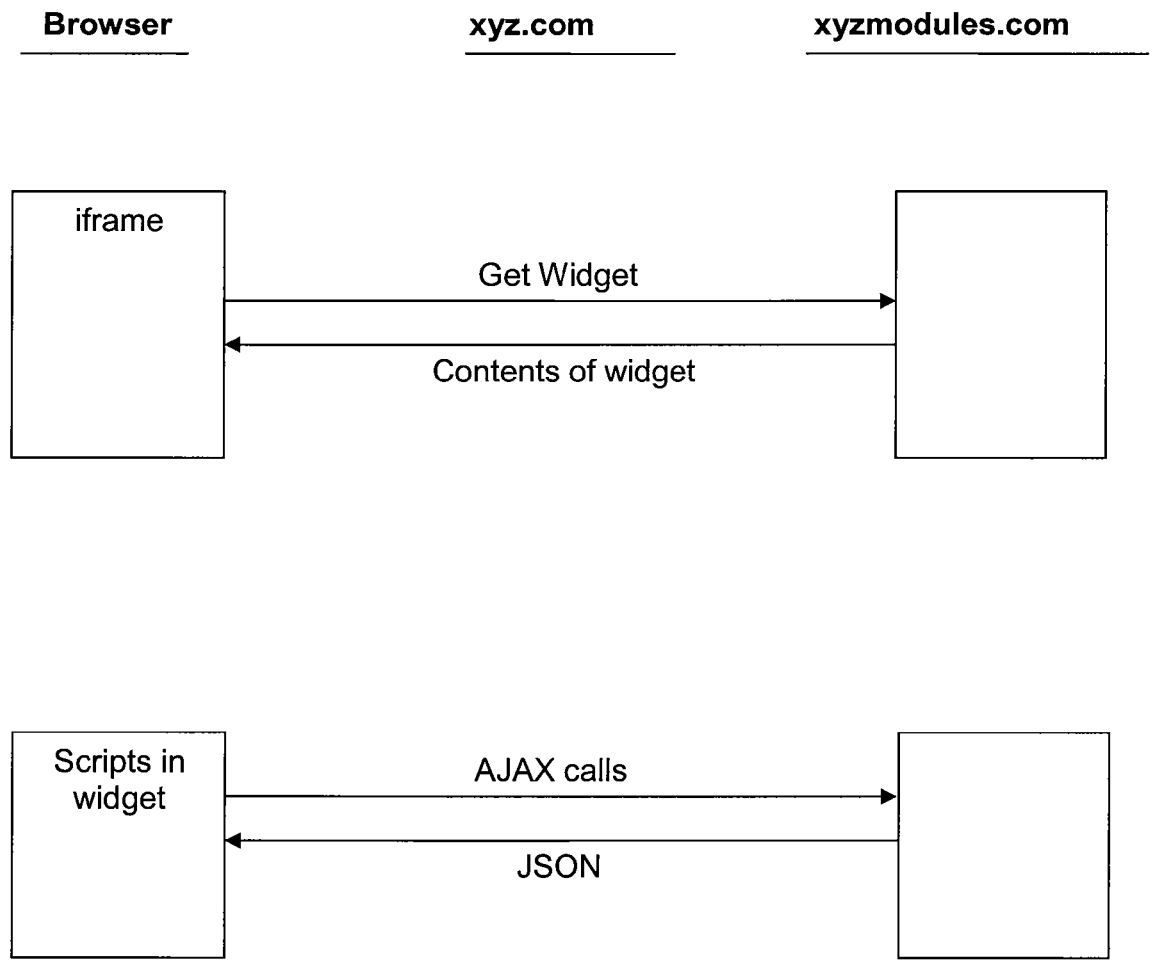
FIG. 7 is a block diagram illustrating the performance of an example implementation of the method of FIG. 5.

The DOM call creates an iframe within the web page based on the iframe url. With reference to FIG. 7, the iframe requests the getProfile widget from xyzmodules.com utilizing the iframe url, including the security token. Xyzmodules.com returns the contents of the widget specified by the iframe url. The contents of the widget may include XML (extensible markup language), HTML (hypertext markup language) and JavaScript™. The getProfile widget may makes or more calls to a social graph on xyzmodules.com. The one or more calls may include OpenSocial (an open source set of common application programming interfaces for web-based social network applications) calls and may be implemented in JavaScript™. The one or more calls result in one or more AJAX (asynchronous JavaScript™ and XML) calls to the social graph on xyzmodules.com. The one or more AJAX calls include the security token.

Xyzmodules.com may determine whether to allow the one or more AJAX calls based on the security token. If allowed, xyzmodules.com transmits data from the social graph, utilizing JSON (JavaScript™ object notification), based on the one or more AJAX calls to the iframe. The iframe then displays the data transmitted by xyzmodules.com. The web browser thus displays the user's profile page, including the web template and the iframe with the returned data from the getProfile widget.

If the one or more AJAX calls do not alter data in the social graph, xyzmodules.com may determine to allow the one or more AJAX calls based on the identity of the user contained in the security token. In this case, xyzmodules.com allows the one or more AJAX calls if the one or more AJAX calls are attempting to access data in the social graph defined as accessible by the user. If the one or more AJAX calls attempt to alter data in the social graph, xyzmodules.com may determine to allow the one or more AJAX calls based on the identity of the user and the iframe url contained in the security token. In this case, xyzmodules.com allows the one or more AJAX calls if the one or more AJAX calls are attempting to access data in the social graph defined as accessible by the user and the iframe url is trusted. The iframe url is trusted if the iframe url is on a trusted widget source list of xyzmodules.com.

It is understood that the above example is merely exemplary. The web page may be a web page other than a profile page or may utilize multiple iframes and/or multiple widgets without departing from the scope of the present disclosure. Additionally, though the above example refers to specific web technologies such as JavaScript™, OpenSocial, AJAX, and JSON, it is understood that other web technologies could be utilized without departing from the scope of the present disclosure.

The present disclosure may provide systems and methods for controlling widget access and/or authenticating widgets. These various features enable social networking features to be added to existing web sites without requiring the web site owner to implement social networking features from scratch or to utilize third party social networks.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A computer-implemented method, comprising:
    receiving a request from a web server to enable access to at least one widget at a content server, the request specifying a user identifier of a user and a delegation server and the widget comprising an embedded context corresponding to an identity of the user;
    determining, at the content server, whether the delegation server is trusted by the content server;
    when the delegation server is trusted, transmitting the user identifier to the delegation server and receiving an identity of the user from the delegation server to ascertain the identity of the user;
    delivering, via the content server, the at least one widget to provide access to content of the content server;
    receiving a request to access the content of the content server, generated utilizing the at least one widget, the at least one widget incorporated into a web page provided by the web server; and
    allowing access to a portion of the content based on the context of the at least one widget.

2. The computer-implemented method of claim 1, wherein the delegation server is trusted if the delegation server is on a trusted list of the content server.

3. The computer-implemented method of claim 1, wherein a part of the content is defined as accessible by the user and wherein the portion of the content comprises a subset of the part of the content.

4. The computer-implemented method of claim 1, wherein the content server comprises a social network server and the content comprises a social graph.

5. The computer-implemented method of claim 4, wherein the at least one widget is incorporated into the web page to provide a social network function via the web page.

6. A computer-implemented method, comprising:
    receiving a request from a web server to enable access to at least one widget at a social network server, the request specifying a user identifier of a user and a delegation server and the at least one widget operable to access a social graph maintained on the social network server;
    determining whether the delegation server is trusted;
    when the delegation server is trusted, transmitting the user identifier to the delegation server and receiving an identity of the user from the delegation server to ascertain the identity of the user;
    delivering, via the social network server, the at least one widget to provide access to the social graph, the at least one widget having a source indicator and a context corresponding to the identity of the user;
    receiving a request to access the social graph, generated utilizing the at least one widget, the at least one widget incorporated into a web page provided by the web server to provide a social network function via the web page;
    determining whether the at least one widget is trusted; and
    allowing the request to access a portion of the social graph accessed based on the context when the request to access includes a change to the social graph, and when the at least one widget is trusted.

7. The computer-implemented method of claim 6, wherein the at least one widget is trusted if the source indicator is on a trusted source list of the social network server.

8. The computer-implemented method of claim 6, wherein the delegation server is trusted if the delegation server is on a trusted delegate list of the social network server.

9. The computer-implemented method of claim 6, wherein a part of the social graph is defined as accessible by the user and wherein the portion of the social graph comprises a subset of the part of the social graph.

10. The computer-implemented method of claim 6, wherein the web page incorporates a web page template for the social network function.

11. The computer-implemented method of claim 6, wherein the request to access the portion of the social graph includes a request for an address of an additional web page for a particular social network function for one of a plurality of users and the social network server constructs the requested address by combining an address template for the particular social function with an identifier of the one of the plurality of users.

12. A computing system, comprising:
    a delegation server configured to receive user identifiers and transmit identities of users corresponding to the user identifiers;
    a content server communicably coupled to the delegation server, the content server including a trusted list identifying trusted delegation servers and content wherein a part of the content is defined as accessible by a user; and a web server communicably coupled to the content server, the web server configured to facilitate a request to enable access to at least one widget at the content server and provide a web page incorporating the at least one widget to a web client, the request specifying a user identifier and the delegation server, wherein the content server is configured to:
ascertain an identity of the user if the delegation server is on the trusted list by transmitting the user identifier to the delegation server and receiving the identity of the user from the delegation server;
deliver the at least one widget to at least one of the web server and the web client to provide access to the content of the content server, the at least one widget comprising an embedded context corresponding to the identity of the user;
receive a request to access the content made utilizing the at least one widget incorporated into the web page; and
allow access to a portion of the content that is a subset of the part of the content based on the context of the at least one widget.

13. The system of claim 12, wherein the web server and the delegation server are incorporated into a single computing device.

14. The system of claim 12, wherein the web server and the delegation server comprise separate computing devices.

15. The system of claim 12, wherein the content server comprises a social network server and the content comprises a social graph.

16. The system of claim 12, wherein the web server is configured to incorporate the at least one widget into the provided web page to provide a social network function via the web page.

17. A computer system, comprising:
a social network server including a trusted source list identifying trusted sources of widgets and a social graph wherein a part of the social graph is defined as accessible by a user; and
a web server communicably coupled to the social network server, the web server configured to facilitate a request to enable access to at least one widget operable to access the social graph from the social network server and provide a web page incorporating the at least one widget to a web client to provide a social network function via the web page;

wherein the social network server is configured to:
deliver, to at least one of the web server and the web client, the at least one widget to provide access to the social graph, the at least one widget including a source indicator and the at least one widget comprising an embedded context corresponding to the identity of the user;
receive a request to access the social graph made utilizing the at least one widget incorporated into the web page; and
allow the request to access, if the request to access includes a change to the social graph, if the at least one widget is on the trusted source list.

18. The system of claim 17, further comprising:
a delegation server communicably coupled to the social network server, the delegation server configured to receive user identifiers and transmit identities of users corresponding to the user identifiers;
wherein the request for at least one widget specifies a user identifier and the delegation server and the social network server is configured to:
ascertain an identity of the user by transmitting the user identifier to the delegation server if the delegation server is on a trusted delegate list identifying trusted delegates; and
allow the request to access a portion of the social graph based on the context of the at least one widget.

19. The system of claim 18, wherein the web page incorporates a web page template for the social network function.

* * * * *